United States Patent [19]

Colombier

[11] Patent Number: 5,066,734

[45] Date of Patent: Nov. 19, 1991

[54] POLYSILAZANE CERAMIC PRECURSORS AND CERAMIC SHAPED ARTICLES PRODUCED BY PYROLYSIS THEREOF

[75] Inventor: Christian Colombier, Lyons, France

[73] Assignee: Atochem, Puteaux, France

[21] Appl. No.: 447,528

[22] Filed: Dec. 7, 1989

[30] Foreign Application Priority Data

Dec. 7, 1988 [FR] France ................................ 88 16065

[51] Int. Cl.$^5$ ............................................ C08F 283/00
[52] U.S. Cl. ...................................... 525/478; 501/92; 528/10; 528/28; 528/31
[58] Field of Search ..................... 525/478; 528/31, 28, 528/10; 501/92

[56] References Cited

U.S. PATENT DOCUMENTS 4,482,669 11/1984 Seyferth et al. ...................... 528/28
4,650,837 3/1987 Seyferth et al. ..................... 525/478

*Primary Examiner*—Melvyn I. Marquis
*Attorney, Agent, or Firm*—Burns, Doane, Swecker & Mathis

[57] ABSTRACT

Polysilazane-based ceramic precursor compositions, well adapted for high yield pyrolytic conversion into ceramic shaped articles, include a polysilazane component derived from ammonia and a polysilazane component derived from a hydrazine.

10 Claims, No Drawings

POLYSILAZANE CERAMIC PRECURSORS AND CERAMIC SHAPED ARTICLES PRODUCED BY PYROLYSIS THEREOF

BACKGROUND OF THE INVENTION

Field of the Invention

The present invention relates to novel polysilazane-based ceramic precursor compositions, and to the ceramic articles produced by shaping and pyrolysis of such novel compositions.

SUMMARY OF THE INVENTION

Briefly, the ceramic precursor compositions of the present invention comprise:

(i) at least one precursor polysilazane comprising a plurality of recurring structural units of the formula:

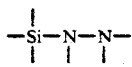  (I)

and (ii) at least one precursor polysilazane comprising a plurality of recurring structural units of the formula:

  (II)

in which formulae the available valencies of the silicon and nitrogen atoms are bonded to a saturated or unsaturated aliphatic hydrocarbon radical or to a mono- or polycyclic aryl, alkylaryl or arylalkyl radical, with the provisos that such substituents may be different or identical, at least one of the available valencies of the silicon atom or of the nitrogen atoms in formula (I) and/or the nitrogen atom in formula (II) may be satisfied by a hydrogen atom, and the silicon atom of formula (II) may be satisfied by a second hydrogen atom, in which instance the nitrogen atom in the same formula (II) then bears a methyl radical.

DETAILED DESCRIPTION OF THE PREFERRED EMBODIMENTS OF THE INVENTION

More particularly according to the present invention, the expression "available valencies" is employed to take account of the bonds between the recurring units of formulae (I) or (II) in the polymeric chain sequences of the subject precursors.

As specific examples of the substituents of the silicon or nitrogen atoms in the above formulae (I) and (II), particularly representative are saturated aliphatic hydrocarbon radicals containing from 1 to 8 carbon atoms, unsaturated hydrocarbon radicals such as vinyl or allyl, alicyclic hydrocarbon radicals containing from 3 to 7 carbon atoms, and phenyl, benzyl, phenylethyl, tolyl, xylyl and naphthyl radicals.

The silicon atom of formula (I) preferably bears a hydrogen atom or a methyl substituent, with the second substituent of the silicon atom of formula (I) being a methyl, ethyl, phenyl or, more preferably, vinyl substituent. In formula (II), the silicon atom preferably bears a methyl radical.

The precursor compositions in accordance with the invention may comprise from 10% to 90% by weight of the precursor(s) of formula (I) and 90% to 10% of the precursor(s) of formula (II). Said compositions preferably comprise from 10% to 70% by weight of the precursor(s) of formula (I) and from 90% to 30% by weight of the precursor(s) of formula (II). Preferred are those compositions which comprise from 10% to 55% of the precursor(s) of formula (I).

The precursors of formula (I) can be prepared by reacting at least one halosilane of the formula:

  (III)

with at least one hydrazine of the formula:

  (IV)

in which formulae Y is a halogen atom, and especially a chlorine atom, is a number ranging from 1 to 4, inclusive, and preferably approximately 2, the free valency or valencies of the silicon and nitrogen atoms being bonded to an unsaturated aliphatic hydrocarbon radical or one of the other atoms or radicals referred to above in the definition of the polysilazanes of formula (I), at least two of the available valencies of the nitrogen atoms being bonded to hydrogen atoms.

The precursors of formula (II) can be prepared by reacting a hydrohalosilane of the formula:

  (V)

where the symbol Y is as defined above, b = 1, 2 or 3 and c = 4 − b; with ammonia or an amine —NH$_2$(when c is 2), the free valency or valencies of the silicon and optionally the nitrogen atoms being bonded to one of the hydrocarbon radicals as defined above or to a hydrogen atom (in the case of hydrohalosilane).

Alternatively, the precursors of formula (I) can be prepared by reacting a precursor of formula (II), obtained, for example, by the process described above, with a hydrazine of formula (IV).

Exemplary of the halosilanes of formulae (III) or (IV), particularly representative are those of the following formulae: SiCl$_4$, (CH$_3$)$_2$SiCl$_2$, (CH$_3$)$_3$SiCl CH$_3$SiCl$_3$, (C$_6$H$_5$)$_2$SiCl$_2$, (C$_6$H$_5$)(CH$_3$)SiCl$_3$ H$_2$SiCl$_2$, (CH$_3$)$_2$HSiCl, HSiCl$_3$ CH$_3$(CH$_2$=CH)SiCl$_2$, (CH$_3$)$_2$(CH$_2$=CH)SiCl and (CH$_3$)HSiCl$_2$.

In the preferred embodiment wherein a is about 2, it will be seen that one or more dihalosilanes, or a mixture comprising one or more dihalosilanes and a mono- or a trihalosilane and/or SiCl$_4$, is, or are, advantageously employed according to the present invention. The percentage of chlorine atoms contributed by the trihalosilane to the mixture with the dihalosilane preferably does not exceed 70%. In the case of monohalosilane or of SiCl$_4$, this percentage preferably does not exceed 30%.

Exemplary of the hydrazines of formula (IV), particularly representative are unsubstituted hydrazine (N$_2$H$_4$), methylhydrazine, ethylhydrazine, phenylhydrazine, cyclohexylhydrazine, dimethylhydrazine, diethylhydrazine, diphenylhydrazine, dibenzylhydrazine, α-naphthylhydrazine, diisopropylhydrazine, ditolylhydrazines, diisobutylhydrazine, (2,3-dimethylphenyl)hydrazine and di(α-naphthyl)hydrazine.

To prepare the precursors of formula (I) by the first aforementioned process, hydrazine (IV) is advantageously employed in an amount such that the number of moles of hydrazine is greater than the number of moles of halogen Y atoms added to the number of moles of silicon atoms. This excess may be, for example, up to 20%.

This reaction is advantageously carried out in the presence of a tertiary amine, such as triethylamine, trimethylamine, triphenylamine or pyridine.

The principal function of such amine is to limit the formation of a hydrazine hydrohalide by reason of the formation of a hydrohalide of said amine.

In general, the amount of amine is at least one molecule of amine per atom of halogen Y. This ratio is preferably in excess, for example by 20%. When an amine is employed, the number of moles of hydrazine may be higher than the number of moles of silicon atoms alone.

If an excess of halosilane is employed per the above, it is advantageous, after having reacted the hydrazine with the halosilane(s), to introduce an excess of a reactant which permits limiting of the halogen content of the final product. Such reactant may be, in general, an amine or ammonia.

This reaction is advantageously carried out in an inert atmosphere, for example under a stream of nitrogen.

The temperature generally ranges from −10° to 100° C. The aforementioned reactants (halosilane and hydrazine) may be employed alone, with the tertiary amine being added, if appropriate. A solvent for the final product polysilazane is preferably employed, especially an optionally halogenated aliphatic or aromatic hydrocarbon such as toluene, methylene chloride, benzene, xylene, hexane, or ethers such as isopropyl ether or diethyl ether.

The reaction may be carried out at atmospheric pressure, under pressure, or under reduced pressure. The operation is preferably carried out at atmospheric pressure.

Upon completion of the reaction, the duration of which may range from a few tens of minutes to a few hours, the hydrohalides are removed, for example by filtration under reduced pressure or under nitrogen pressure, and the solvent, if employed, and the excess hydrazine or tertiary amine are removed, for example by evaporation under reduced pressure. Polysilazanes are thus recovered in the form of rigid or resinous solids or of a more or less viscous oil.

To prepare the precursors of formula (II), an amount of ammonia or of amine is advantageously employed such that the number of moles of ammonia or of amine is greater than the number of moles of halogen Y atoms added to the number of moles of silicon atoms. This excess may be up to 20%. The ammonia may be used in diluted form, for example with nitrogen. The reaction may be carried out at a temperature ranging from −20° C. to 100° C. or less than the boiling point of the optional solvent, when this temperature is below 100° C. at atmospheric pressure. It is also possible to operate at subatmospheric or superatmospheric pressure.

The reaction is advantageously carried out in an organic solvent medium. Exemplary of such solvents, particularly representative are optionally chlorinated hydrocarbons such as methylene chloride, carbon tetrachloride, toluene and benzene.

The hydrogen halide acid formed during this reaction precipitates in the form of ammonium halide, which can be removed by filtration. The solvent for the polysilazane can be removed by evaporation.

One or more cyclic or linear polysilazanes containing recurring units of formula (II) can be generally recovered upon completion of this reaction, the duration of which is from a few tens of minutes to a few hours.

To carry out the second process for the preparation of the precursors of formula (I), a hydrazine (IV) may be reacted with a precursor of formula (II), prepared, for example, as described above.

In general, an amount of hydrazine is used that is sufficient to permit the substitution of the —NH— groups in formula (II) by the —N—N— groups of formula (I).

The hydrazine of formula (IV) is advantageously used in anhydrous form and the reaction temperature may range, for example, from 20° to 100° C. at atmospheric pressure. The reaction is accompanied by a release of ammonia, with termination of such release indicating completion of the reaction, following a period of time which can range from a few tens of minutes to a few hours. It is advantageous to introduce an organic solvent into the reaction mixture, for example one of the products mentioned above. After separation of the dense phase containing the excess unreacted hydrazine and evaporation of the solvent, a polyhydrosilazane containing a plurality of recurring units of formula (I) is recovered in the form of a viscous liquid.

The compositions in accordance with this invention may be formulated simply by admixing the precursors of formulae (I) and (II), preferably under an inert atmosphere, for example under nitrogen. This admixing may be carried out at ambient temperature and more generally at a temperature ranging from 0° to 100° C.

The compositions may then be shaped at ambient temperature, or after heating to a temperature which may be up to 300° C.

Solutions of the subject compositions may be used to form coatings on substrates such as metals (metallic silicon, steel, molybdenum, nickel-rich alloys) or ceramics, it being possible for the thickness of such coatings to be on the order of 0.01 to 100 μm. Where the coating contains an additive such as silicon carbide or nitride powders, this thickness may be up to several millimeters.

The use of hydrogenated precursors

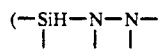

and

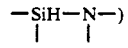

permits the viscosity of the subject compositions to be controlled, the former being used to increase the viscosity and the latter to decrease it. Furthermore, such precursors result in thermally crosslinkable products, and this is of advantage for certain applications, such as the spinning of fibers.

The shaped compositions can then be pyrolyzed by heating to a temperature on the order of 800° to 1,500° C. into a ceramic containing Si, N and optionally O and/or C.

The pyrolysis may be carried out in an inert atmosphere, namely, under nitrogen or argon, or in an ammonia atmosphere if it is desired to decrease the carbon content of the ceramic or even to eliminate it.

After pyrolysis, the precursor compositions in accordance with the invention produce ceramics in a ceramic yield which is higher both than the arithmetic mean of the mixture of the two precursors and, in certain cases, than the yield observed separately with the precursors of formulae (I) and (II).

In order to further illustrate the present invention and the advantages thereof, the following specific examples are given, it being understood that same are intended only as illustrative and in nowise limitative.

In said examples to follow, the ceramic yield values (=weight of ceramic obtained/weight of precursor employed x 100) were measured by thermogravimetric analysis without confinement and under a nitrogen purge. The temperature increase was 100° C./hour and was followed by a plateau of one hour at 1,000° C., the maximum temperature.

EXAMPLES 1 to 5

(A) Synthesis of an ammonolysate of $CH_3SiHCl_2$ (precursor 1A)

The reaction was carried out in a jacketed reactor fitted with a thermometer, a stirring system and a condenser (15° C.).

After the reactor had been purged with nitrogen, 800 ml of toluene and 1.2 moles of $CH_3SiHCl_2$ were poured into it at 15° C. The reactor was cooled to 2° C. and 4.66 moles of $NH_3$ diluted with 2.33 moles of $N_2$ were introduced at a constant rate, under stirring, over 6 hours. During the last hour, the reactor temperature was increased to 20° C. Gentle stirring was continued for 15 hours at 15° C. The ammonium chloride was filtered off under nitrogen and was washed with two 300-mol portions of toluene. The solvent was then evaporated from the ammonolysate solution at 60° C., in vacuum with the aid of a rotary evaporator. The evaporation was completed by maintaining the residue for ½ hour at 60° C. at approximately 5 mm Hg. 56 g of ammonolysate were collected, which corresponded to a 79.1% yield based on the formation of the recurring units:

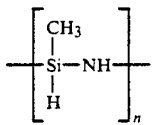

This ammonolysate had a viscosity of approximately 0.4 poises at 25° C.

(B) Synthesis of a hydrazine derivative of $CH_3SiCH_2Cl_2$ (precursor 1B)

The apparatus described above under (A) was employed. 600 ml of toluene, 0.8 moles of methylvinyldichlorosilane $CH_3SiCH=CH_2Cl_2$, 0.2 moles of methyltrichlorosilane and 2.64 moles of triethylamine were poured into the reactor at ambient temperature. 1.2 moles of hydrazine were introduced over 30 min, under stirring, while the reactor temperature was maintained at 15° C. The reactor was heated to 70° C. while stirring was continued. After 6 hours, 0.5 moles of ammonia were introduced, still at 70° C. and under stirring. The reactor was cooled to 15° C. and maintained for 15 hours under gentle stirring. The precipitate was filtered off under nitrogen and was washed with two 400-ml portions of toluene. The solvent was then evaporated from the solution at 60° C., under vacuum with the aid of a rotary evaporator. The evaporation was completed by maintaining the residue for ½ hour at 60° C. at approximately 5 mm Hg. Approximately 83 g of polysilazane (precursor 1B) were collected. It contained approximately 0.64 moles of N—N bond per 100 g of product.

(C) Preparation and pyrolysis of mixtures of precursors 1A and 1B

The precursors 1A and 1B were mixed under nitrogen and in various proportions. The ceramic yields under nitrogen at 1,000° C. were then determined.

The results are reported in the Table I below:

TABLE I

|  | EXAMPLES | | | | | | |
|---|---|---|---|---|---|---|---|
|  | * | 1 | 2 | 3 | 4 | 5 | * |
| Polysilazane 1A (% by weight) | 100 | 80 | 60 | 50 | 40 | 20 | 0 |
| Polysilazane 1B (% by weight) | 0 | 20 | 40 | 50 | 60 | 80 | 100 |
| Ceramic yield (% by weight) | 41.8 | 68 | 68.2 | 67.2 | 62.8 | 62 | 59.7 |

*Comparative Example.

EXAMPLES 6 TO 10

A) Preparation of a hydrazine derivative of $(CH_3)_2SiCl_2$

The procedure was as in part (b) of Example 1, but using 1 mole of dimethyldichlorosilane, 3 moles of triethylamine and 1.4 moles of hydrazine; no ammonia was introduced upon completion of the reaction. The mixture was heated to 60° C. for 6 hours.

After evaporation of the solvent, 73.5 g were collected of a liquid polysilazane, designated the precursor 2A.

(B) Preparation and pyrolysis of mixtures of precursors 1A and 2A

The precursors 1A and 2A were mixed under nitrogen and in various proportions. The ceramic yields under nitrogen at 1,000° C. were then determined.

The results are reported in the Table II below:

TABLE II

|  | EXAMPLES | | | | | | |
|---|---|---|---|---|---|---|---|
|  | * | 6 | 7 | 8 | 9 | 10 | * |
| Precursor 1A (% by weight) | 100 | 90 | 80 | 60 | 50 | 30 | 0 |
| Precursor 2A (% by weight) | 0 | 10 | 20 | 40 | 50 | 70 | 100 |
| Ceramic yield (% by weight) | 41.8 | 43.9 | 44 | 40.25 | 38.05 | 23.6 | 2.2 |

*Comparative Example

It was determined that the combination of the two precursors 1A and 2A also resulted in a ceramic yield which was higher than the arithmetic mean of the mixture of the two precursors.

EXAMPLE 11

(A) Synthesis of a hydrazine derivative of $CH_3SiHCl_2$ (precursor 11A)

The apparatus described in Example 1A was employed. 600 ml of toluene, 1 mole of hydromethyldichlorosilane $(CH_3SiHCl_2)$ and 2.4 moles of triethylamine were poured into the reactor at ambient temperature. Water at 15° C. was passed through the reactor jacket. 1.2 moles of anhydrous hydrazine were introduced over 1 hour, the reactor being stirred. It was found that the temperature increased from 16.5° to 23° C. After the introduction of hydrazine, the reactor temperature was increased to 70° C. and stirring was continued for 6 hours. The reactor was then returned to 15° C. and maintained for 15 hours under gentle stirring. The precipitate was filtered off under nitrogen and washed with three 300-ml portions of toluene.

A toluene solution of polysilazane at a concentration of ≈4.6% by weight was thus obtained. When the solvent was evaporated from 100 g of the said solution in a rotary evaporator as indicated in the preceding examples, 4.6 g of an infusible and insoluble solid crosslinked polysilazane were obtained. This polysilazane gave a ceramic yield of 72%.

(B) Preparation and pyrolysis of mixtures of precursors 1A and 11A

The precursor 1A and toluene solution of precursor 11A were mixed in various proportions. The solvent was then evaporated off using a rotary evaporator as described in the preceding examples. The viscosities and the ceramic yields under nitrogen at 1,000° C. were then determined.

The results are reported in the Table III below:

TABLE III

| | | | | | |
|---|---|---|---|---|---|
| Polysilazane 1A (% by weight) | 100 | 75 | 50 | 25 | 0 |
| Polysilazane 11A (% by weight) | 0 | 25 | 50 | 75 | 100 |
| Viscosity (poise) at 20° C. | 0.4 | 143 | 3200 | >20000 | infusible crosslinked solid |
| Ceramic yield at 1,000° C. under N$_2$ | 41.8 | 65.2 | 67.2 | 69.4 | 72 |

It will be appreciated that these mixtures continued to progress towards higher viscosities at ambient temperature and that this change was proportionally faster the higher the temperature and the higher the proportion of polysilazane 11A. It can be ascertained, in fact, that the viscosity of the mixture of 25% of 1A and 75% of 11A at 70° C. changed from 1,000 p to 8.000 p in 30 minutes.

The preparation of a polysilazane composition of high viscosity which crosslinks thermally such as to become infusible has thus been demonstrated. This property is advantageous for the production of ceramic fibers, because the high viscosity of the precursor is necessary for spinning and because the crosslinking of the polymer is indispensable for setting the fiber in its shape and preventing it from melting at the beginning of pyrolysis.

EXAMPLE 12

(A) Synthesis of a hydrazine derivative of a mixture of CH$_3$SiHCl$_2$(80 mol %) and of (CH$_3$)$_2$SiCl$_2$ (20 mol %)

The procedure was as in Example 11A, but a mixture of 0.8 moles of hydromethyldichlorosilane and 0.2 moles of dimethyldichlorosilane was employed instead of one mole of hydromethyldichlorosilane.

(B) Preparation and pyrolysis of mixtures of precursors 1A and 12A

The precursor 1A and the solution of precursor 12A were mixed in various proportions. The solvent was then evaporated off in rotary evaporator as described in the preceding examples. The viscosities and the ceramic yields under nitrogen at 1,000° C. were then determined.

The results are reported in the Table IV below:

TABLE IV

| | | | | | |
|---|---|---|---|---|---|
| Polysilazane 1A (% by weight) | 100 | 75 | 50 | 25 | 0 |
| Polysilazane 12A (% by weight) | 0 | 25 | 50 | 75 | 100 |
| Viscosity (poise) at 20° C. | 0.4 | 37.5 | 1530 | >20000 | infusible crosslinked solid |
| Ceramic yield at 1,000° C. under N$_2$ | 41.8 | 61.8 | 67.5 | 68.6 | 67.1 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A ceramic precursor composition which comprises:

(i) at least one precursor polysilazane comprising a plurality of recurring structural units of the formula:

and (ii) at least one precursor polysilazane comprising a plurality of recurring structural units of the formula:

in which formulae the available valencies of the silicon and nitrogen atoms are bonded to a saturated or unsaturated aliphatic hydrocarbon radical or to a mono- or polycyclic aryl, alkylaryl or arylalkyl radical, with the provisos that such substituents may be different or identical, at least one of the available valencies of the silicon atom or of the nitrogen atoms in formula (I) and/or the nitrogen atom in formula (II) may be satisfied by a hydrogen atom, and the silicon atom of formula (II) may be satisfied by a second hydrogen atom, in which instance the nitrogen atom in said formula (II) is substituted by a methyl radical.

2. The ceramic precursor composition as defined by claim 1, wherein said formulae (I) and (II) the silicon atom substituents are saturated aliphatic hydrocarbon radicals containing from 1 to 8 carbon atoms, unsaturated hydrocarbon radicals, alicyclic hydrocarbon radicals containing from 3 to 7 carbon atoms, or phenyl, benzyl, phenylethyl, tolyl, xylyl or naphthyl radicals.

3. The ceramic precursor composition as defined by claim 1, wherein formula (I) said silicon atom is substituted by a hydrogen atom or a methyl radical, and also by a second methyl, ethyl, phenyl or vinyl radical.

4. The ceramic precursor composition as defined by claim 1, wherein formula (II) said silicon atom is substituted by a methyl radical.

5. The ceramic precursor as defined by claim 1, comprising from 10% to 90% by weight of said precursors of formula (I) and from 90% to 10% by weight of said precursors of formula (II).

6. The ceramic precursor composition as defined by claim 5, comprising from 10% to 70% by weight of said precursors of formula (I) and from 90% to 30% by weight of said precursors of formula (II).

7. The ceramic precursor composition as defined by claim 6, comprising from 10% to 55% by weight of said precursors of formula (I) and 45% to 90% by weight of said precursors of formula (II).

8. A shaped article comprising the ceramic precursor composition as defined by claim 1.

9. The shaped article as defined by claim 8, comprising a fiber, filament, film or coating.

10. A ceramic material comprising the product of pyrolysis of the shaped article as defined by claim 8.

* * * * *